(12) United States Patent
Kim et al.

(10) Patent No.: US 11,125,567 B2
(45) Date of Patent: Sep. 21, 2021

(54) METHODS AND SYSTEMS FOR MAPPING AND LOCALIZATION FOR A VEHICLE

(71) Applicant: GM GLOBAL TECHNOLOGY OPERATIONS LLC, Detroit, MI (US)

(72) Inventors: Keun Jae Kim, Rochester Hills, MI (US); Collin N. Kappauf, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 313 days.

(21) Appl. No.: 16/251,690

(22) Filed: Jan. 18, 2019

(65) Prior Publication Data

US 2020/0232801 A1 Jul. 23, 2020

(51) Int. Cl.
*G01C 21/32* (2006.01)
*G06F 16/29* (2019.01)
*G01S 13/89* (2006.01)
*G01S 13/931* (2020.01)

(52) U.S. Cl.
CPC .............. *G01C 21/32* (2013.01); *G01S 13/89* (2013.01); *G01S 13/931* (2013.01); *G06F 16/29* (2019.01)

(58) Field of Classification Search
CPC ......... G01C 21/32; G01C 21/28; G06F 16/29; G01S 13/89; G01S 13/931; G01S 7/412; G01S 13/06; G01S 7/415; G06K 9/00791
See application file for complete search history.

(56) References Cited

U.S. PATENT DOCUMENTS

2010/0066587 A1* 3/2010 Yamauchi ........... G01S 13/0209
342/70
2020/0055515 A1* 2/2020 Herman .................. H04W 4/46

OTHER PUBLICATIONS

Riesterer, Jim. "UTM—Universal Transverse Mercator Geographic Coordinate System", Apr. 7, 2008. Geospatial Training and Analysis Cooperative, Introduction to Topographic Maps. (Year: 2008).*

* cited by examiner

*Primary Examiner* — Michael V Kerrigan
(74) *Attorney, Agent, or Firm* — Lorenz & Kopf LLP

(57) ABSTRACT

Systems and methods are provided for localizing a vehicle. In one embodiment, a method includes: receiving, by a processor, radar data from a radar of the vehicle; creating, by the processor, a local map based on the radar data; retrieving, by the processor, a map of an environment from a datastore based on a predicted vehicle pose; correlating, by the processor, the local map and the retrieved map; determining, by the processor, a localized vehicle pose based on the correlating; and controlling, by the processor, the vehicle based on the localized vehicle pose.

15 Claims, 10 Drawing Sheets

METHODS AND SYSTEMS FOR MAPPING AND LOCALIZATION FOR A VEHICLE

INTRODUCTION

The present disclosure generally relates to vehicles, and more particularly relates to generating maps using radar data and localizing the vehicle based on radar data and the maps.

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

While autonomous vehicles and semi-autonomous vehicles offer many potential advantages over traditional vehicles, in certain circumstances it may be desirable for improved operation of the vehicles. For example, autonomous vehicles determine their location, for example, within the environment and in particular within lane boundaries (referred to herein as localization) and use that location to navigate the vehicle. Autonomous vehicles determine their location based on maps of the environment. Some maps are generated from data received from a lidar. Lidars can be expensive and are not optimum in severe weather conditions.

Accordingly, it is desirable to provide improved systems and methods for generating maps and localizing a vehicle. It is further desirable to provide improved systems and method for mapping and localizing the vehicle based on sensor data from sensors already available on an autonomous vehicle, such as radars. Furthermore, other desirable features and characteristics of the present disclosure will become apparent from the subsequent detailed description and the appended claims, taken in conjunction with the accompanying drawings and the foregoing technical field and background.

SUMMARY

Systems and methods are provided for localizing a vehicle. In one embodiment, a method includes: receiving, by a processor, radar data from a radar of the vehicle; creating, by the processor, a local map based on the radar data; retrieving, by the processor, a map of an environment from a datastore based on a predicted vehicle pose; correlating, by the processor, the local map and the retrieved map; determining, by the processor, a localized vehicle pose based on the correlating; and controlling, by the processor, the vehicle based on the localized vehicle pose.

In various embodiments, the local map is an image map that includes a plurality of cells that include radar data. In various embodiments, each cell of the plurality of cells includes radar cross-section data of the radar data that is transformed into Universal Transverse Mercator coordinates. In various embodiments, the local map includes a computed weight for each cell of the plurality of cells. In various embodiments, the weight is based on a distance the vehicle traveled since receiving the radar data.

In various embodiments, the weight is based on an azimuth angle and a range of the radar data. In various embodiments, the weight is based on a radar cross-section of the radar data. In various embodiments, the correlating comprises computing a similarity metric between the local map and the retrieved map.

In various embodiments, the retrieved map includes a plurality of grid maps that are associated with a location of the predicted vehicle pose. In various embodiments, the retrieved map includes weights that are based on a detection probability distribution function, and wherein the correlating is based on the weights.

In various embodiments, the method further includes filtering the radar data based on filtering parameters when creating the local map, wherein the filtering parameters include at least one of dynamic returns, returns with host vehicle speed, radar field of view, and ambiguous returns.

In another embodiment, a system includes: at least one radar that generates radar data associated with an environment of the vehicle; and a controller configured to, by a processor, receive the radar data, create a local map based on the radar data, retrieve a map of the environment from a datastore based on a predicted vehicle pose, correlate the local map and the retrieved map, determine a localized vehicle pose based on the correlating, and control the vehicle based on the localized vehicle pose.

In various embodiments, the local map is an image map that includes a plurality of cells that include radar data. In various embodiments, each cell of the plurality of cells includes radar cross-section data of the radar data that is transformed into Universal Transverse Mercator coordinates.

In various embodiments, the local map includes a computed weight for each cell of the plurality of cells. In various embodiments, the weight is based on a distance the vehicle traveled since receiving the radar data, an azimuth angle and a range of the radar data, and a radar cross-section of the radar data.

In various embodiments, the controller correlates by: computing a similarity metric between the local map and the retrieved map. In various embodiments, the retrieved map includes a plurality of grid maps that are associated with a location of the predicted vehicle pose. In various embodiments, the retrieved map includes weights that are based on a detection probability distribution function, and wherein the controller correlates based on the weights.

In various embodiments, the controller is further configured to filter the radar data based on filtering parameters when creating the local map, wherein the filtering parameters include at least one of dynamic returns, returns with host vehicle speed, radar field of view, and ambiguous returns.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
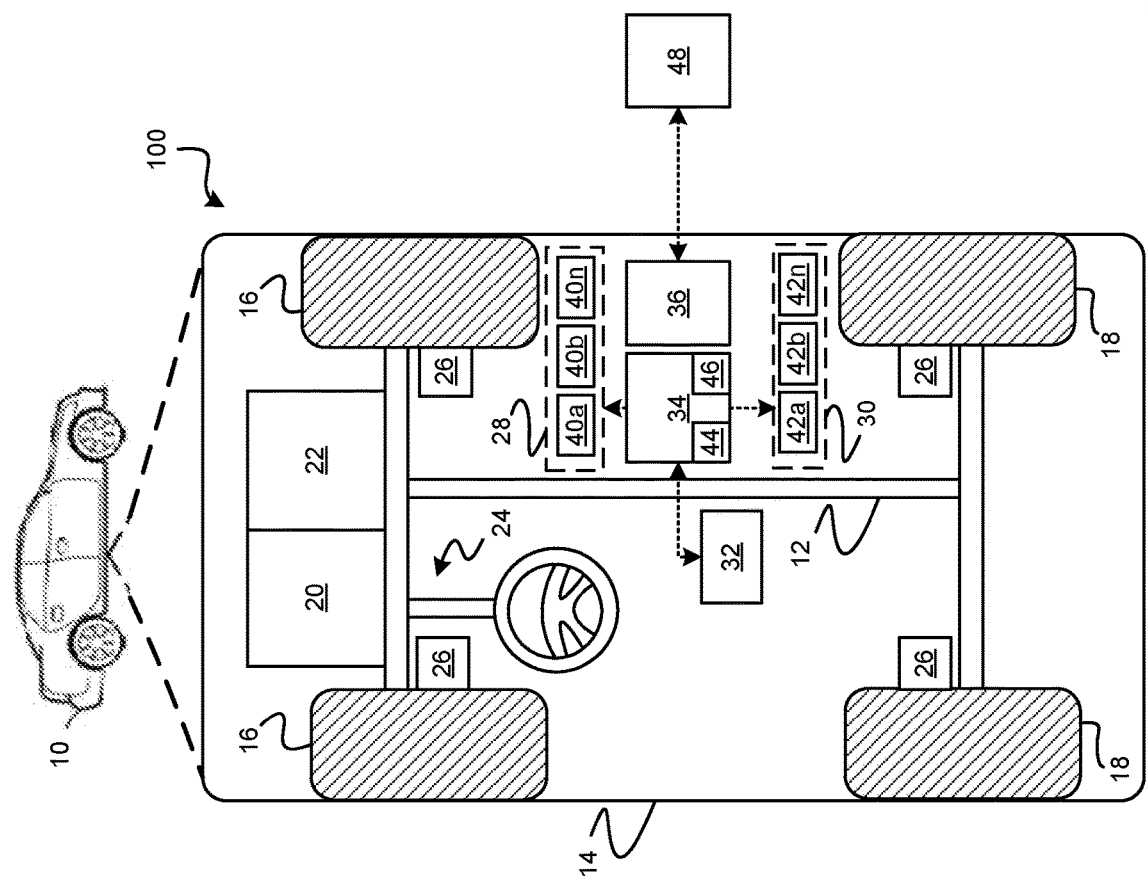
FIG. 1 is a functional block diagram illustrating an autonomous vehicle having a mapping and localization system, in accordance with various embodiments.

With reference to FIG. 1, a mapping and localization system shown generally at 100 is associated with a vehicle 10 in accordance with various embodiments. In general, the mapping and localization system 100 processes data provided by one or more radars disposed about the vehicle 10 (as will be discussed in more detail below) to determine a map of the environment. The mapping and localization system 100 then uses the map as well as additional data from the radar to localize the vehicle 10 as the vehicle travels. The vehicle 10 then intelligently navigates based on the localization.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the localization system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, or simply robots, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. As can be appreciated, in various embodiments, the autonomous vehicle 10 can be any level of automation.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, inertial measurement units, and/or other sensors. In various embodiments, the sensing devices 40a-40n include one or more image sensors that generate image sensor data that is used by the localization system 100.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
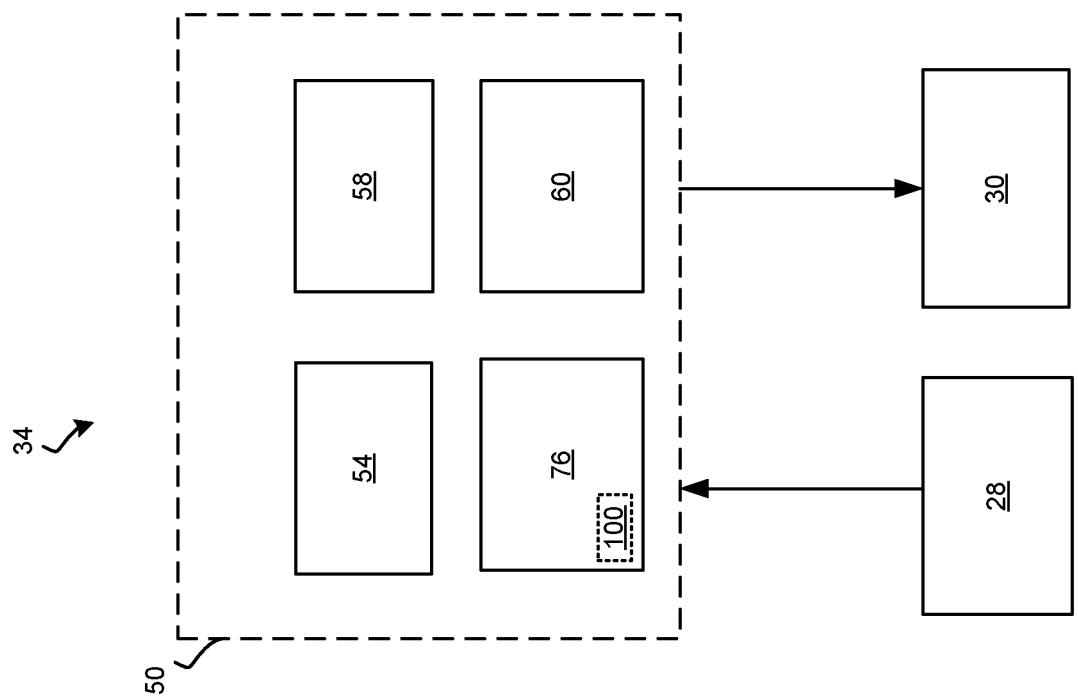
FIG. 2 is a dataflow diagrams illustrating an autonomous driving system that includes the mapping and localization system, in accordance with various embodiments.

The communication system 36 is configured to wirelessly communicate information to and from other entities 48, such as but not limited to, other vehicles ("V2V" communication) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps include maps generated from the mapping and localization system 100. In various embodiments, the maps are received from a remote system and/or other vehicles. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the mapping and localization system 100 and, when executed by the processor 44, process data from the radars to determine a map of the environment; and determines the vehicle location based on the map of the environment. For example, the mapping and localization system 100 generates a highly accurate grid (image) map, identifying permanent objects in the environment. Each cell (pixel) in the grid map, for example, is mapped to a Universal Transverse Mercator (UTM) coordinate system and represents discretized environment with radar perceived property. The radar grid map is then used to localize and control the vehicle 10.

As can be appreciated, the subject matter disclosed herein provides certain enhanced features and functionality to what may be considered as a standard or baseline autonomous vehicle 10 and/or an autonomous vehicle based remote transportation system (not shown) that coordinates the autonomous vehicle 10. To this end, an autonomous vehicle and autonomous vehicle based remote transportation system can be modified, enhanced, or otherwise supplemented to provide the additional features described in more detail below.

In accordance with various embodiments, the controller 34 implements an autonomous driving system (ADS) 50 as shown in FIG. 2. That is, suitable software and/or hardware components of the controller 34 (e.g., the processor 44 and the computer-readable storage device 46) are utilized to provide an autonomous driving system 50 that is used in conjunction with vehicle 10.

In various embodiments, the instructions of the autonomous driving system 50 may be organized by function, module, or system. For example, as shown in FIG. 2, the autonomous driving system 50 can include a computer vision system 54, a positioning system 56, a guidance system 58, and a vehicle control system 60. As can be appreciated, in various embodiments, the instructions may be organized into any number of systems (e.g., combined, further partitioned, etc.) as the disclosure is not limited to the present examples.

In various embodiments, the computer vision system 54 synthesizes and processes sensor data and predicts the presence, location, classification, and/or path of objects and features of the environment of the vehicle 10. In various embodiments, the computer vision system 54 can incorporate information from multiple sensors, including but not limited to cameras, lidars, radars, and/or any number of other types of sensors.

The positioning system 56 processes sensor data along with other data to determine a position (e.g., a local position relative to a map, an exact position relative to lane of a road, vehicle heading, velocity, etc.) of the vehicle 10 relative to the environment. The guidance system 58 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

As mentioned briefly above, the mapping and localization system 100 of FIG. 1 is included within the ADS 50, for example, as part of the positioning system 56. For example, the mapping and localization system 100 provides maps and localization data to the positioning system 56 indicating an exact location of the vehicle 10 relative to the environment.

Mapping

Figure 3:
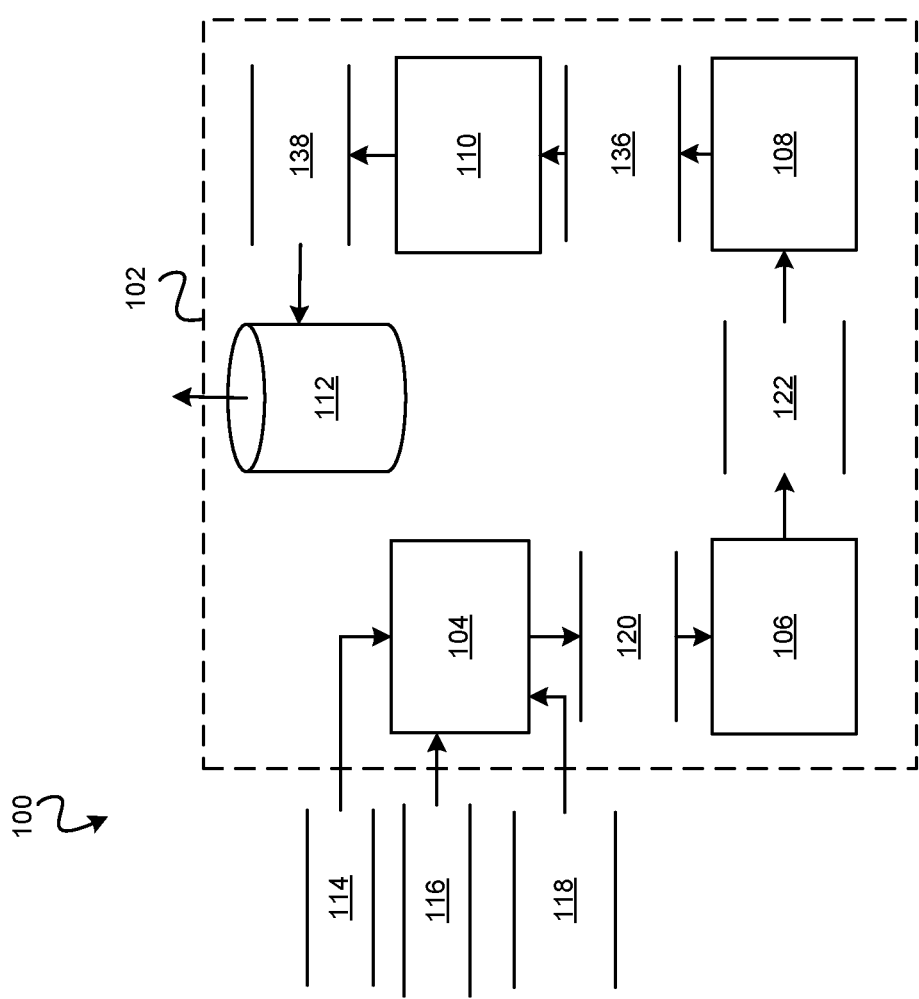
FIG. 3 is a dataflow diagram illustrating a mapping system of the mapping and localization system, in accordance with various embodiments.

As shown in more detail with regard to FIG. 3 and with continued reference to FIGS. 1 and 2, the mapping and localization system 100 includes a mapping system 102. The mapping system 102 includes a data pre-processing module 104, a data filtering module 106, a data transformation module 108, a grid map generation module 110, and a map datastore 112.

The data pre-processing module 104 collects data from the sensor system 28. For example, the data pre-processing module 104 collects radar data 114 (e.g., range, azimuth angle, range rate, RCS, etc.), global positioning system (GPS) data 116 (e.g., latitude, longitude, heading, etc.), and wheel speed sensor data 118 (e.g., wheel speeds). The data pre-processing module 104 synchronizes the received data 114-118 based on an associated timestamp and location and provides synchronized data 120 based thereon. For example, the radar data may be delayed based on radar speeds and processing rates. The known delays are taken into account when synchronizing the data 114-118.

The data filtering module 106 receives the synchronized data 120 and filters the data 120 based on one or more filtering parameters. The filtering parameters may include, for example, but are not limited to, dynamic returns, returns with host vehicle speed, radar field of view, ambiguous returns, etc. As can be appreciated, other filtering parameters can be defined in various embodiments. The filtering module 106 filters out of the synchronized data any radar returns satisfying any one of the defined filtering parameters. The resulting radar returns is provided as filtered data 122.

Figure 9:
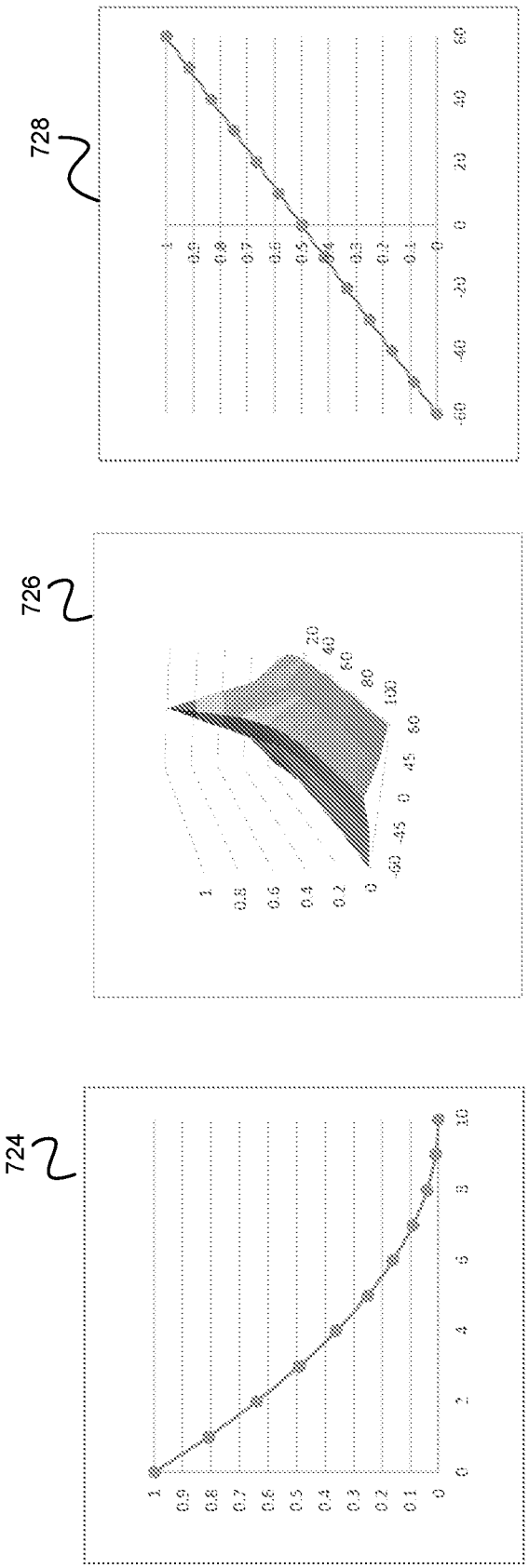
FIG. 9 is an illustration of curves used by the localization system of the mapping and localization system, in accordance with various embodiments.

In various embodiments, the filtered data 122 includes a computed weight for every radar return. The filtering module 106 computes the weights, for example, based on values such as a weight curve 134 derived from a detection probability distribution function 132. As shown in more detail in FIG. 4, the data filtering module 106, evaluates a defined radar azimuth accuracy curve 127 (having azimuth angle defined in degrees along the x-axis and accuracy defined in degrees along the y-axis) to determine an accuracy standard deviation 128. The data filtering module 106 then computes the weight curve 134 by multiplying the range 130 with the accuracy standard deviation 128. For example, FIG. 9 illustrates an exemplary weight curve 134 that can be produced. The weight curve 134 can then be used to obtain the weight. For example, for each azimuth angle 124 associated with a lidar return, and the associated range 130, a weight 135 is obtained from the weight curve 134.

With reference back to FIG. 3, the data transformation module 108 receives the filtered data 108 and transforms the GPS data associated with the radar returns of the filtered data 136 into a cartesian coordinate system using, for example, Universal Transverse Mercator (UTM) conformal projection. As can be appreciated, other methods of transforming the data into a coordinate system can be implemented in various embodiments. The data transformation module 108 generates transformed data 136 based on the transformation.

The grid map generation module 110 receives the transformed data 136 and generates a grid map 138. The grid map generation module 110 generates the grid map 138 by first creating an empty grid map having a size that is dependent upon the GPS information. Each cell of the empty grid map can have a dimension of 10 cm by 10 cm, in various embodiments. As can be appreciated, other cell sizes can be implemented in other embodiments.

The grid map generation module 110 then populates each cell of the empty grid map with the radar return of the transformed data 136. The grid map generation module 110 then applies data enhancing techniques to the populated grid map. For example, the grid map generation module 110 filters out of the populated grid map any noisy returns using, for example, k-nearest neighbor methods. In another example, the grid map generation module 110 smoothes the populated grid map using, for example, morphological image processing to fill up empty cells and remove noise and/or using, for example, a gaussian filter to smooth edges.

The grid map generation module 110 then divides the enhanced grid map into smaller grid maps. For example, the smaller grid maps can have a size of 100 meters by 100 meters, in various embodiments. As can be appreciated, the smaller grid maps can have smaller or larger sizes in various other embodiments. The smaller grid maps are assigned an index based on their location relative to the larger grid map. The grid map generation module 112 then saves the smaller grid maps in the map datastore 112 based on their respective index.

The map datastore 112 stores the enhanced grid map 138 as a collection of smaller grid maps associated with a GPS location. The map datastore 112 makes available the stored grid maps 138 for further processing.

Figure 4:
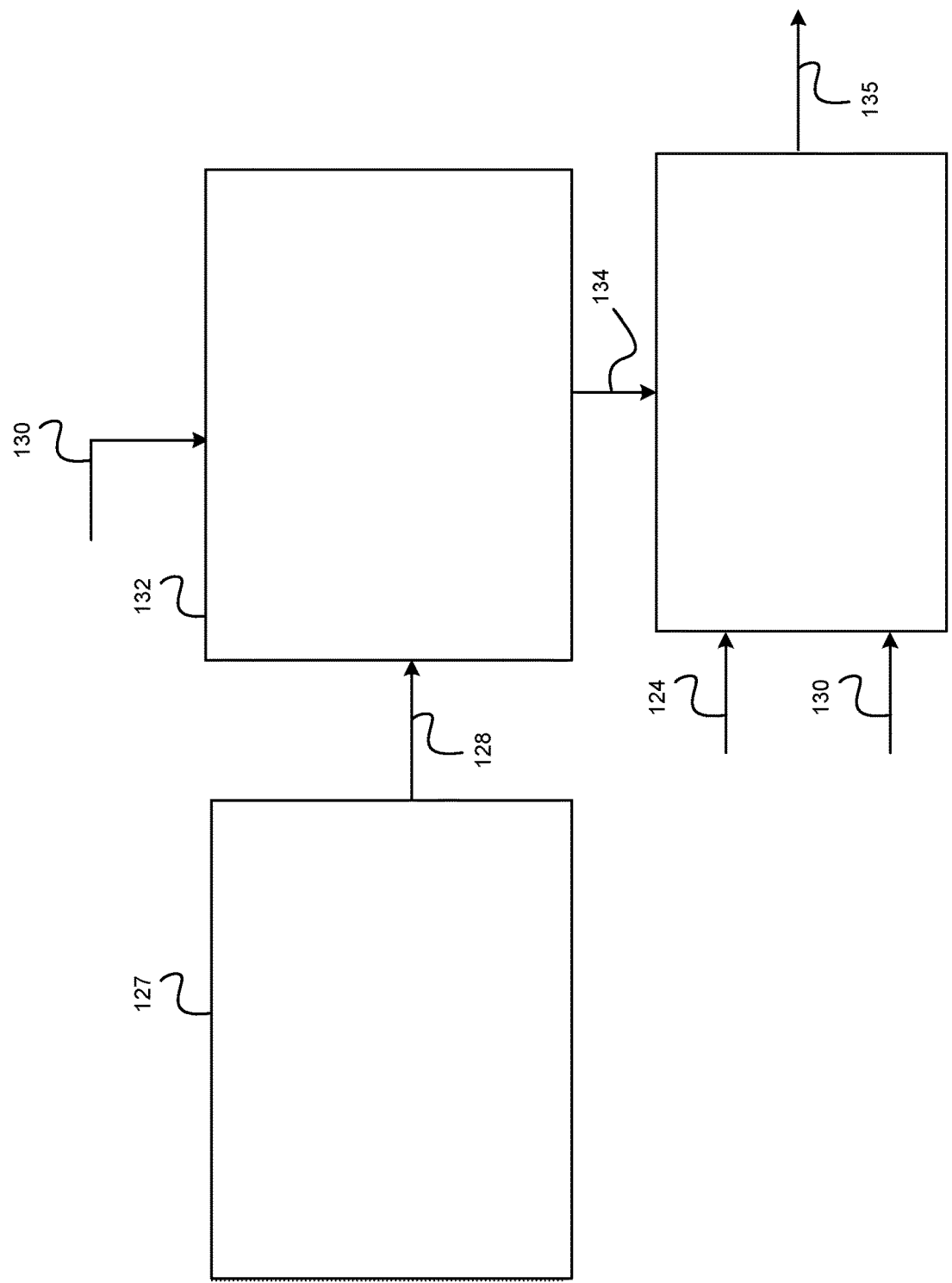
FIG. 4 is an illustration of curves used by the mapping system, in accordance with various embodiments.
Figure 5:
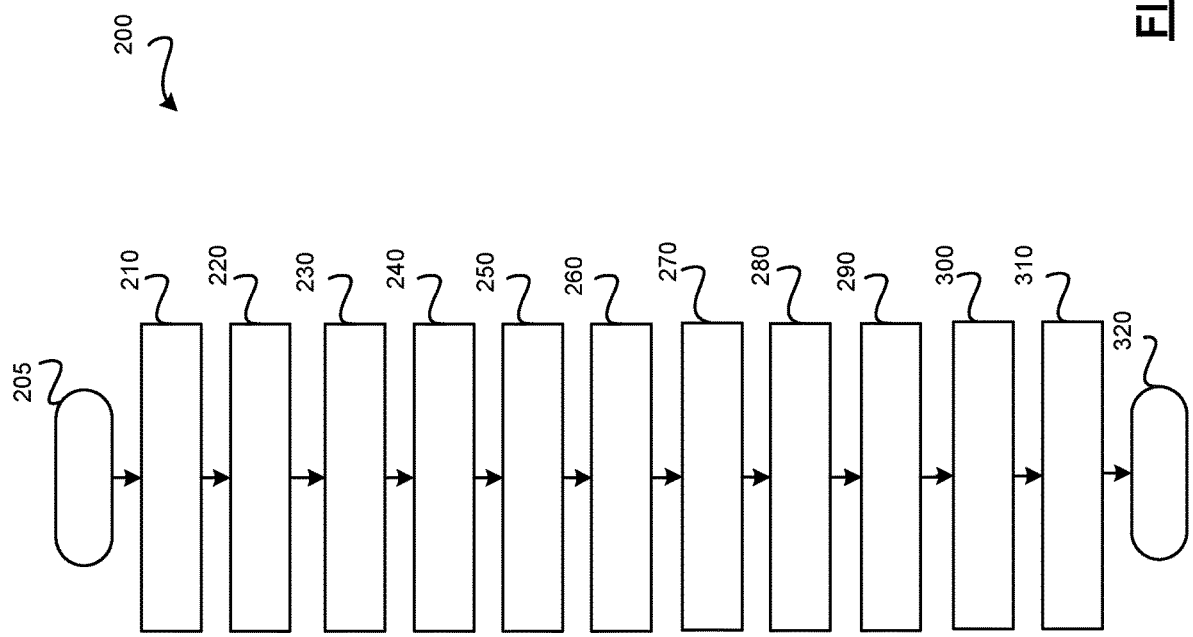
FIGS. 5, 6, and 7 are flowcharts illustrating mapping methods that may be performed by the mapping and localization system, in accordance with various embodiments.

With reference now to FIG. 5 and with continued reference to FIGS. 1-4, a flowchart illustrates a mapping method 200 that can be performed by the mapping system 102 in accordance with various embodiments. As can be appreciated, in light of the disclosure, the order of operation within the method 200 is not limited to the sequential execution as illustrated in FIG. 5 but may be performed in one or more varying orders as applicable and in accordance with the present disclosure. In various embodiments, the method 200 can be scheduled to run based on one or more predetermined events, and/or can run continuously during operation of the autonomous vehicle 10.

In one example, the method 200 may begin at 205. Data 114-118 is collected from the sensor system 28, such as, from the radar, the wheel speed sensors, and the global positioning system at 210. The GPS data 116 is processed at 220. The data 114-118 is synchronized based on the GPS data at 230. The synchronized data 120 is filtered and weights are computed at 240. The filtered data 122 is then transformed in to the UTM coordinates at 250 An empty grid map is created at 260. The empty grid map is updated with the transformed data 136 at 270. The updated grip map is then filtered at 280. The filtered grid map is enhanced at 290. Thereafter, the grid map is divided into smaller grid maps and each smaller grid map is assigned an index based on its location in the larger grid map at 300. The divided grip map data 138 is then saved in the map datastore 112 based on its index at 310. Thereafter, the method may end at 320.

Figure 6:
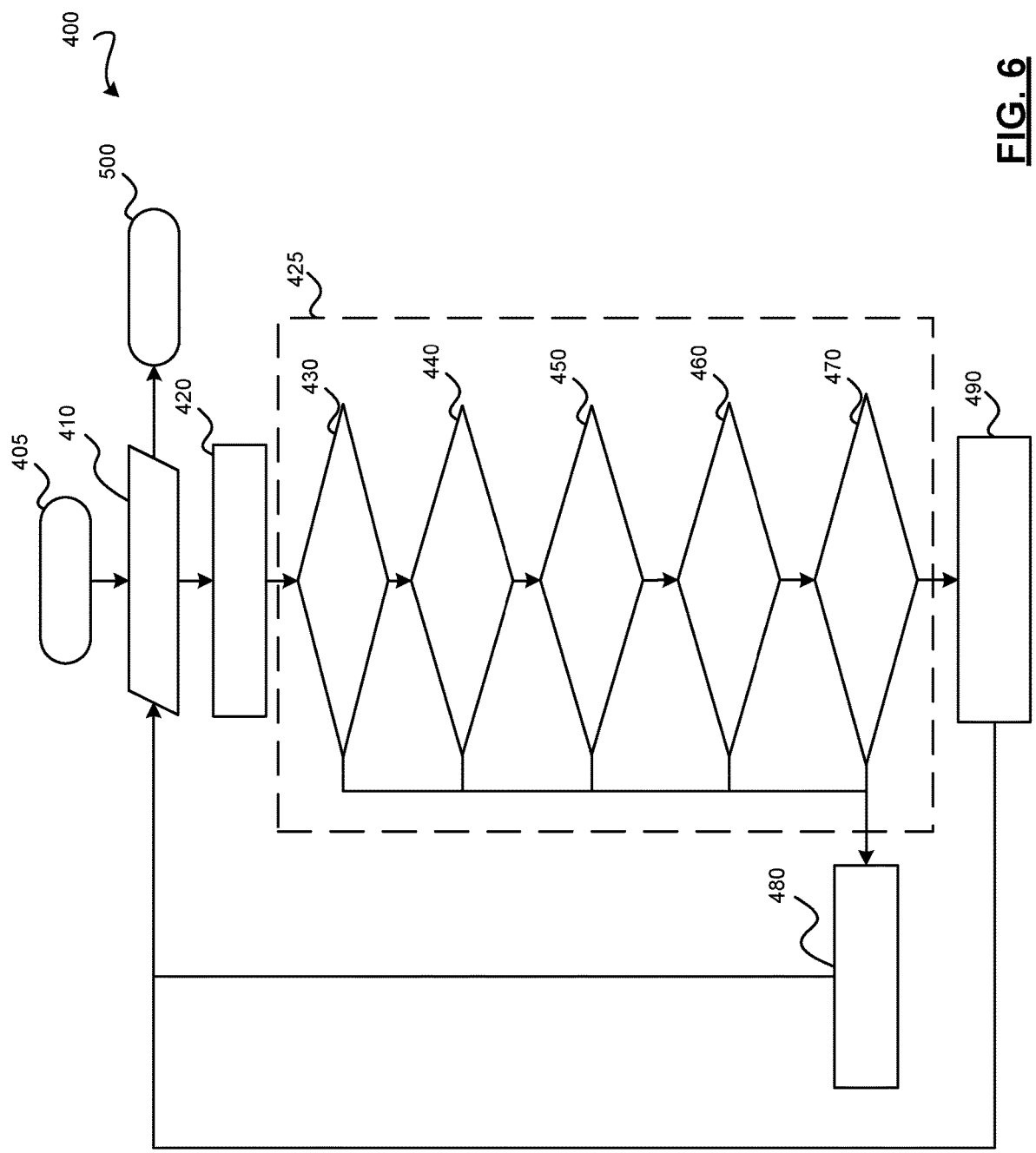

With reference now to FIG. 6 and with continued reference to FIGS. 1-4, a flowchart illustrates a filtering method 400 that can be performed by the mapping system 102 in accordance with various embodiments. The filtering can be performed, for example, by the data filtering module 106 of FIG. 3, in various embodiments. As can be appreciated in light of the disclosure, the order of operation within the method 400 is not limited to the sequential execution as illustrated in FIG. 6 but may be performed in one or more varying orders as applicable and in accordance with the present disclosure. In various embodiments, the method 400 can be scheduled to run based on one or more predetermined events, and/or can run continuously during operation of the autonomous vehicle 10.

In one example, the method 400 may begin at 405. For each measurement of the radar data at 410, the measurement is processed at 420 and evaluated based on a decision tree 425 to decide whether to discard or to preserve the data. In various embodiments, each node of the decision tree 425 may be defined based on a filtering parameter. For example, at 430 it is determined whether the measurement is from a dynamic object. If so, the measurement is discarded at 480. In another example, it is determined whether the measurement is a ghost detection at 440 If so, the measurement is discarded at 480. In another example, it is determined whether the measurement is a from a non-permanent object at 450. If so, the measurement is discarded at 480. In another example, it is determined whether the measurement is outside of a threshold range at 460. If so, the measurement is discarded at 480. In another example, it is determined whether the measurement is from outside of a defined field of view threshold at 470. If so, the measurement is discarded at 480.

If the measurement is not discarded, the weight is computed at 490 based on the weight curve 135 for the measurement based on, for example, the azimuth angle and the range as discussed with regard to FIG. 4. Once all of the measurements have been processed at 410, the method may end at 500.

Figure 7:
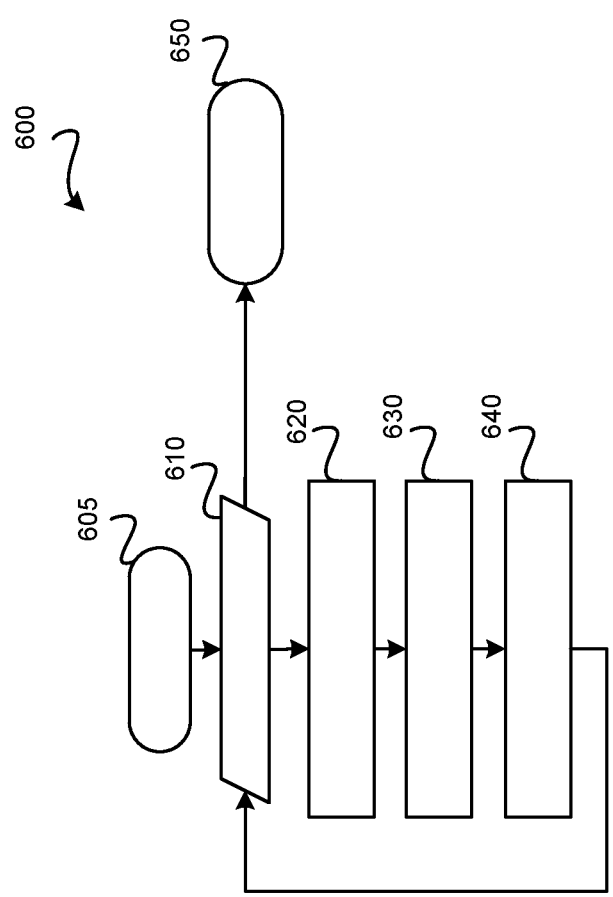

With reference now to FIG. 7 and with continued reference to FIGS. 1-5, a flowchart illustrates a filtering method 600 that can be performed by the mapping system 102 in accordance with the present disclosure. The filtering method 600 can be performed, for example, by the grid map generation module 110 of FIG. 3 in various embodiments. As can be appreciated in light of the disclosure, the order of operation within the method 600 is not limited to the sequential execution as illustrated in FIG. 7 but may be performed in one or more varying orders as applicable and in accordance with the present disclosure. In various embodiments, the method 600 can be scheduled to run based on one or more predetermined events, and/or can run continuously during operation of the autonomous vehicle 10.

In one example, the method 600 may begin at 605. For each cell of the updated grid map, any grid cell determined to be empty is filled in at 620. For example, for an empty cell with four or more non-empty neighbor cells, an average of the non-empty neighbor cells is determined, and the empty cell is populated with the average.

Thereafter, noise is filtered out from the cell at 630. For example, if a cell has three or less non-empty cells, the cell is made empty. The cell is then smoothed at 640. For example, a gaussian filter is applied to the cell at 640. Once all of the cells have been processed at 610, the method may end at 650.

Localization

Figure 8:
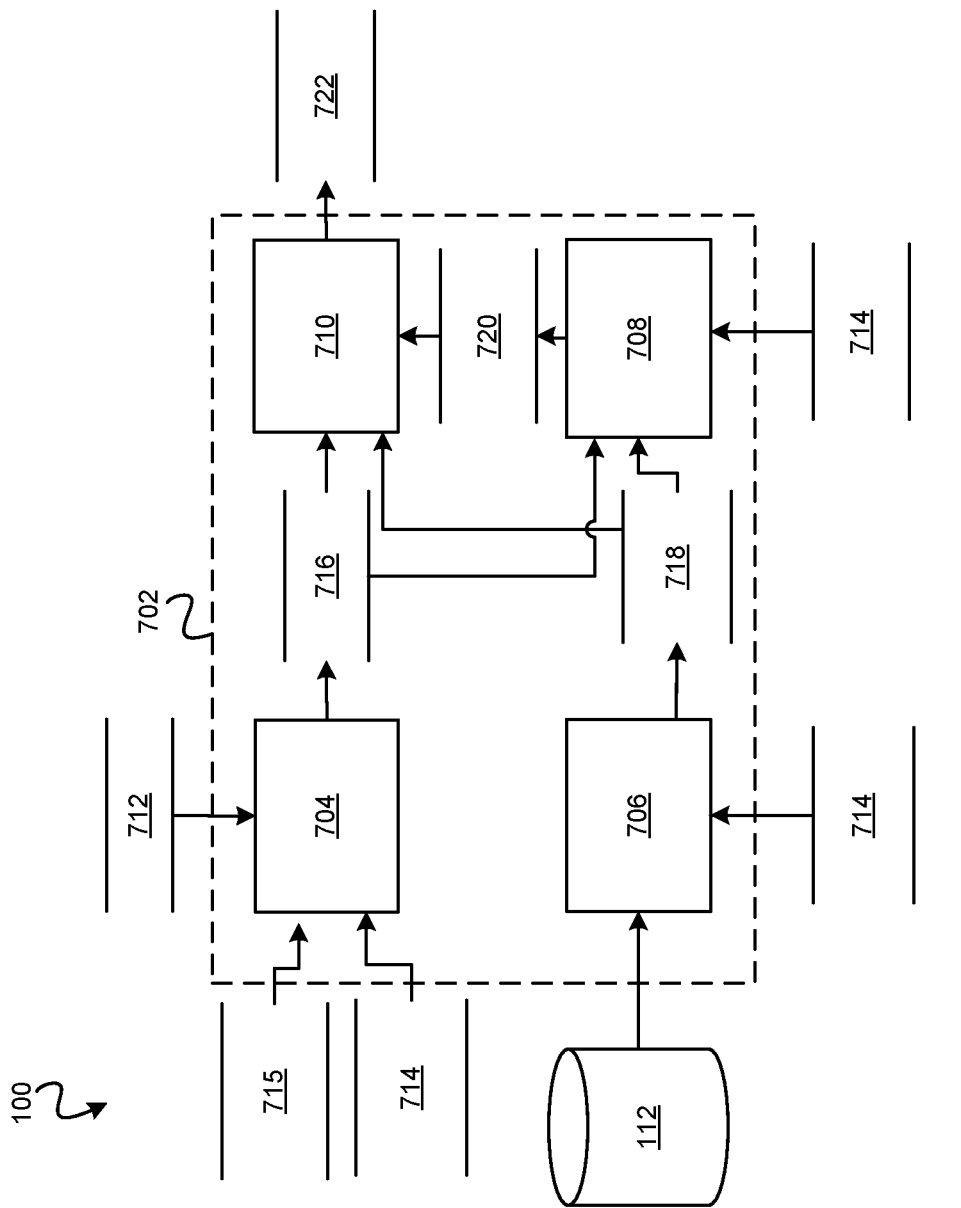
FIG. 8 is a dataflow diagram illustrating a localization system of the mapping and localization system, in accordance with various embodiments.

With reference now to FIG. 8, in various embodiments, the mapping and localization system 100 further includes a localization system 702. The localization system 702 localizes the autonomous vehicle 10 based on the grid maps stored in the map datastore 112. In various embodiments the localization system 702 includes a local map builder module 704, a map publisher module 706, a localizer module 708, and a visualizer module 710.

The local map builder module 704 receives the radar data 712 (e.g., range, azimuth angle, range rate, radar cross-section (RCS) etc.) obtained from a local scan of the environment of the vehicle 10, vehicle pose data 714 (e.g., x, y coordinates, heading, etc.) generated by an odometry system, and wheel speed data 715. The local map builder module 704 builds a local map 716 of the environment based on the received data 712-215. For example, the local map builder module 704 builds the local map 716 using the methods and systems as discussed above.

In various embodiments, the local map 716 includes a weighted map. The weighted map may include weights calculated for each cell/pixel. The weights may be calculated based on a distance traveled since the measurement was received, the range and azimuth angle associated with the cell, and/or the RCS of the measurement. For example, as shown in FIG. 9, the local map builder module 704 may determine the weight for each cell indexed by x=i and y=j as:

$$W(i,j) = e^{ln(W_{dist}(i,j)) + ln(W_{r\theta}(i,j)) + ln(W_{rcs}(i,j))}$$

Where $W(i, j)$ represents a weight assigned to a cell x=i, y=j. $W_{dist}(i, j)$ represents a weight based on distance the vehicle 10 traveled since the measurement was received (e.g., as shown by the curve 724 of FIG. 9, where the distance traveled is represented in meters along the x-axis and the weight is represented along the y-axis). Where $W_{r\theta}(i, j)$ represents a weight based on range and azimuth angle of the measurement (e.g., as shown by the curve 726 of FIG. 9, where the azimuth angle is represented in degrees on the x-axis, the range is represented in meters along the z-axis, and the weight is represented along the y-axis). Where $W_{rcs}(i, j)$ represents a weight based on the RCS of the measurement (e.g., as shown by the curve 728 of FIG. 9, where RCS is represented in decibels along the x-axis and the weight is represented along the y-axis).

In various embodiments, the distance traveled since the measurement resets when localization is performed (e.g., when the local map is correlated to a pre-stored map to find the vehicle pose.) In the example $W_{dist}$ curve in FIG. 9, $W_{dist}=0$ at distance=10 because localization is performed at every 10 m of driving distance. The same equation without $W_{dist}$ may be used in the mapping process.

With reference back to FIG. 8, the map publisher module 706 receives the current pose 714 of the vehicle 10. The map publisher module 706 retrieves from the map datastore 112 stored grid maps located near the vehicle pose 714. For example, nine (or some other number) of smaller grid maps are retrieved based on a relative location to the x, y coordinate of the vehicle pose 714, for example, with the x, y coordinate being in a center grid map of the nine grid maps. The nine smaller grid maps may be collectively referred to as the retrieved map 718.

The localizer module 708 receives the predicted vehicle pose 714, the local map 716 including the weights, and the retrieved map 718. The localizer module 708 determines a localized pose 720 of the vehicle 10 based on a correlation between the local map 716 and the retrieved map 718. For example, any similarity metric used in computer vision technique can be used to correlate the two maps. For example, a sum of squared differences can be computed between the local map and the pre-stored map at multiple locations around the predicted vehicle pose and the location (x, y, and heading). The location with the highest similarity score is selected as the localized pose 720.

The visualizer module 710 receives the localized vehicle pose 720, the local map 716, and/or the retrieved map 718. The visualizer module 710 associates the vehicle 10 with the local map and/or the retrieved map 718 based on the localized vehicle pose 720. For example, an indicator of the vehicle 10 may be placed on the retrieved map 718 and/or the local map 716 in a position indicated by the determined vehicle pose 720. The indicator and the retrieved map and/or the local map 718 may then be evaluated as localization data 722 when navigating the vehicle 10.

Figure 10:
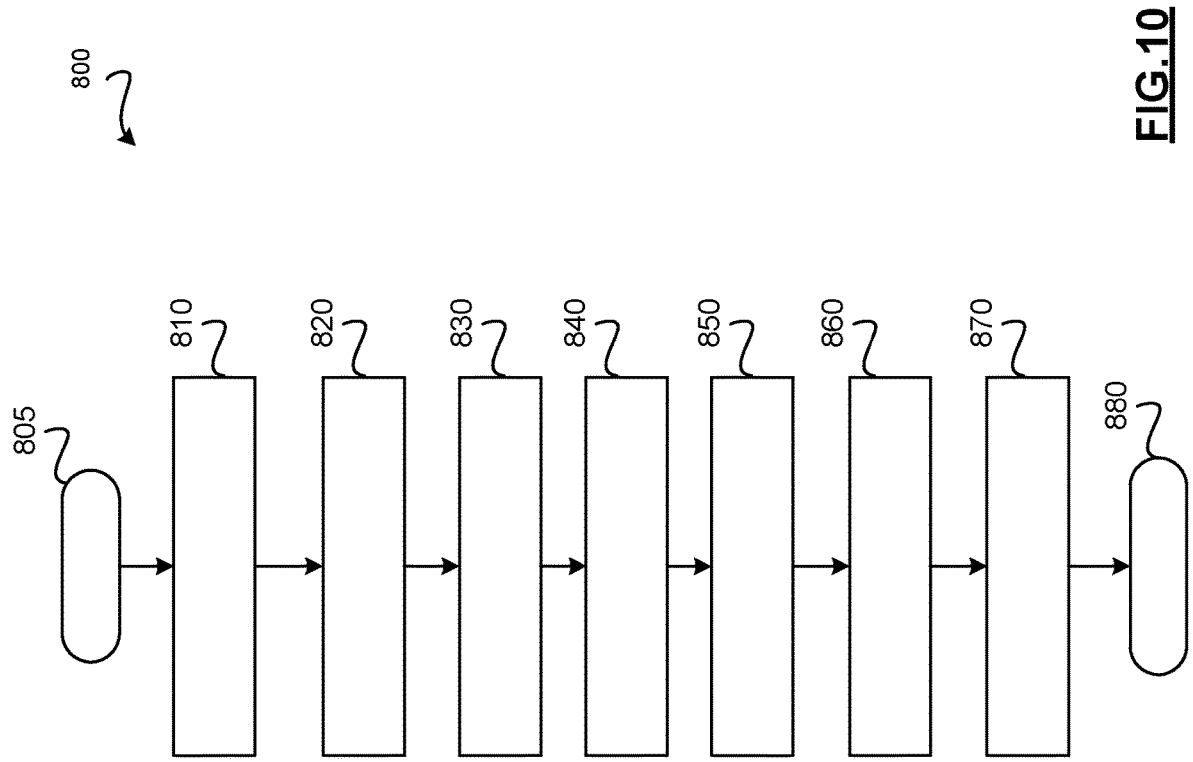
FIG. 10 is a flowchart illustrating a localization method that may be performed by the mapping and localization system, in accordance with various embodiments.

Referring now to FIG. 10, and with continued reference to FIGS. 1-9, a flowchart illustrates a control method 800 that can be performed by the localization system 702 of FIG. 8 in accordance with various embodiments. As can be appreciated in light of the disclosure, the order of operation within the method 800 is not limited to the sequential execution as illustrated in FIG. 10 but may be performed in one or more varying orders as applicable and in accordance with the present disclosure. In various embodiments, the method 800 can be scheduled to run based on one or more predetermined events, and/or can run continuously during operation of the autonomous vehicle 10.

In one embodiment, the method 800 may begin at 805. The radar data 712 is accumulated at 810. Upon a determined trigger, the local map 716 including the computed weights is generated at 820. The map 718 is retrieved from the map datastore 112 at 830. The local map 716 and the retrieved map 718 are correlated at 840. The localized pose 720 is then determined based on the correlation at 850. The localization data 722 is then generated based on the localized vehicle pose 720 and the retrieved map 718 and/or the local map 716 at 860. Thereafter, the vehicle 10 may be controlled based on the localization data at 870. The method 800 may end at 880.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for localizing a vehicle, comprising:
   receiving, by a processor, radar data from a radar device of the vehicle;
   creating, by the processor, a local map based on the radar data, wherein the local map is an image map that includes a plurality of cells that include a computed weight for each cell of the plurality of cells, wherein the weight is based on an azimuth angle and a range of the radar data;
   retrieving, by the processor, a map of an environment from a datastore based on a predicted vehicle pose;
   correlating, by the processor, the local map and the retrieved map;
   determining, by the processor, a localized vehicle pose based on the correlating; and
   controlling, by the processor, the vehicle based on the localized vehicle pose.

2. The method of claim 1, wherein each cell of the plurality of cells includes radar cross-section data of the radar data that is transformed into Universal Transverse Mercator coordinates.

3. The method of claim 1, wherein the weight is based on a distance the vehicle travelled since receiving the radar data.

4. The method of claim 1, wherein the weight is based on a radar cross-section of the radar data.

5. The method of claim 1, wherein the correlating comprises computing a similarity metric between the local map and the retrieved map.

6. The method of claim 1, wherein the retrieved map includes a plurality of grid maps that are associated with a location of the predicted vehicle pose.

7. The method of claim 1, wherein the retrieved map includes weights that are based on a detection probability distribution function, and wherein the correlating is based on the weights.

8. The method of claim 1, further comprising filtering the radar data based on filtering parameters when creating the local map, wherein the filtering parameters include at least one of dynamic returns, returns with host vehicle speed, radar field of view, and ambiguous returns.

9. A system for localizing a vehicle, comprising:
   at least one radar device that generates radar data associated with an environment of the vehicle; and
   a controller configured to, by a processor, receive the radar data, create a local map based on the radar data, retrieve a map of the environment from a datastore based on a predicted vehicle pose, correlate the local map and the retrieved map, determine a localized vehicle pose based on the correlating, and control the vehicle based on the localized vehicle pose, wherein the local map is an image map that includes a plurality of cells that include a computed weight for each cell of the plurality of cells, wherein the weight is based on an azimuth angle and a range of the radar data.

10. The system of claim 9, wherein each cell of the plurality of cells includes radar cross-section data of the radar data that is transformed into Universal Transverse Mercator coordinates.

11. The system of claim 9, wherein the weight is based on a distance the vehicle travelled since receiving the radar data, and a radar cross-section of the radar data.

12. The system of claim 9, wherein the controller correlates by:
    computing a similarity metric between the local map and the retrieved map.

13. The system of claim 9, wherein the retrieved map includes a plurality of grid maps that are associated with a location of the predicted vehicle pose.

14. The system of claim 9, wherein the retrieved map includes weights that are based on a detection probability distribution function, and wherein the controller correlates based on the weights.

15. The system of claim 9, wherein the controller is further configured to filter the radar data based on filtering parameters when creating the local map, wherein the filtering parameters include at least one of dynamic returns, returns with host vehicle speed, radar field of view, and ambiguous returns.

* * * * *